Oct. 13, 1959   T. A. BEAZLEY   2,908,295
FLEXIBLE PIPES
Filed June 19, 1957

Inventor
Thomas Alfred Beazley
By Hoopes Leonard + Buell

United States Patent Office 2,908,295
Patented Oct. 13, 1959

2,908,295

FLEXIBLE PIPES

Thomas Alfred Beazley, London, England, assignor to BTR Industries Limited, a British company Application June 19, 1957, Serial No. 666,879

Claims priority, application Great Britain June 20, 1956

6 Claims. (Cl. 138—50)

The invention relates to flexible pipes of the kind in which flexibility is obtained at the sacrifice of resistance to elongation. Such pipes include those of which the walls are formed with circumferential or helical corrugations to provide flexibility, pipes of the kind constructed from strip material wound helically and usually having an interlocking sealing engagement of the abutting edges of the strip and pipes constructed of elastic material whether or not they have circumferential reinforcing means such as wire or cotton braiding or a spiral winding of wire.

A difficulty which arises with flexible pipes of the above kind under some conditions of use (e.g. the application of sudden or pulsating changes of internal pressure) is that they are subject to sudden elongations or vibrations which, apart from being objectionable for other reasons, may in time cause fatigue failure of the pipe. It is already known to provide the pipes with an external covering or braided wire which provides some measure of resistance to elongation but as such braided coverings are themselves subject to elongation they are to a substantial extent ineffective to prevent elongation. It is an object of the invention to provide pipes of the above kind with improved means for resisting elongation.

The invention provides a flexible pipe of the above kind characterized by an internal cable, wire, rod or the like arranged to resist lengthening of the pipe (e.g. under internal pressure).

Preferably the cable or the like is located on or close to the neutral axis of the pipe. Means may be provided for maintaining the cable on the neutral axis, for example the cable may be provided with spiders or the like at intervals along its length.

The cable may be secured at its ends to the pipe or to attachment fittings on the pipe or to coupling means to which the pipe is connected and means may be provided for applying tension to the cable or the like. These tensioning means may be employed to apply an initial compressive load on the pipe.

The pipe is not necessarily flexible throughout its length.

Figure 1:
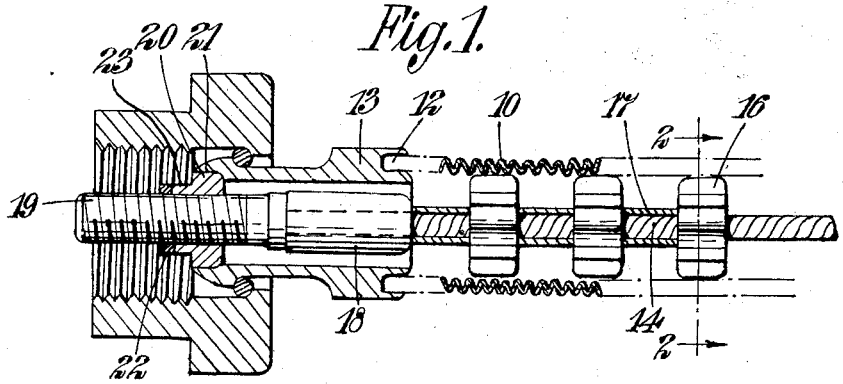
Figure 2:
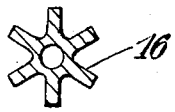
Figure 3:
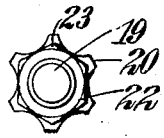

As an example a specific construction of a pipe according to the invention will now be described with reference to the accompanying drawings in which:

Figure 1 represents a section through the pipe at one end thereof, Figure 2 is a section through a spider, and Figure 3 is an end view of a bridge piece and lock nut.

In this example the pipe 10 is circumferentially corrugated and, at each end, is brazed into a groove 12 in a coupling fitting 13.

Within the pipe there is a flexible cable 14 of multi-strand steel or non-ferrous wire. The cable is held at, or close to, the centre line or neutral axis of the pipe by spiders 16 threaded over the cable and separated by spacing tubes 17. Secured to each end of the cable there is a member 18 which has a screw threaded portion 19. Screwed onto the portion 19 there is a spider-like bridge-piece 20 which seats in a recess 21 in the fitting 13. Rotation of the bridge-piece on the thread will accordingly vary the tension in the cable accompanied by pre- compression of the pipe. The bridge-piece is locked on the thread by a nut 22. To facilitate rotation of the bridge-piece it is provided with a hexagonal portion 23.

The invention is not restricted to the details of the above example. For instance the ends of the cable may be attached to the mating parts (not shown) of the couplings instead of to the detachable coupling fittings 13. For this purpose the mating coupling parts may have fixed internal bridges into which the ends 19 of the members 18 may be screwed. Access to the members 18 may be obtained for this purpose by drawing back the fittings 13 which is rendered possible by the endwise compressibility of the pipe.

The arms of the spiders 16 and the bridge pieces 20 may be stream-lined to reduce the resistance to flow of fluid along the pipe and the arms of the spiders 16 may have an axial length sufficient to ensure contact with two, or more, of the internal ridges of the pipe. Further their ends may be curved to conform to the maximum permissible bend curvature of the pipe.

In use the ends of the pipe may be secured, for example, in line or at right angles and the cable substantially prevents elongation of the pipe under internal pressure such as would cause the pipe to "buck." The cable does not however interfere with the bending of the pipe.

In the case of a pipe of small internal diameter, the spiders 16 may be omitted so that bending of the pipe accompanied by elongation will be restricted by engagement of the walls of the pipe with the cable. The cable may be provide with a thin protective cover to reduce chafing against the pipe and the cover may be continuous or in the form of beads. It should be of a material resistant to deterioration under the conditions of use.

When spiders are employed as above described they have the additional advantage of resisting buckling of the tube. The arms of the spiders should have sufficient strength to resist the side thrust between the cable and the tube whether due to buckling or the bending force on the tube.

I claim:

1. A pipe assembly comprising a flexible pipe, end fittings secured to the ends thereof, a flexible elongated tension-resisting member within the pipe, said member being substantially smaller in section than the bore of the pipe, means by which the flexible member is secured at its ends to the end fittings and a succession of short tubular elements threaded along the flexible member in continuous end-to-end abutting relation between the means by which the member is secured to the end fittings, at least some of said tubular elements having radiating arms carrying bearing surfaces at their outer ends which surfaces bear against the internal surfaces of the pipe, whereby the flexible member is held spaced from the said internal surfaces.

2. A pipe assembly as claimed in claim 1 in which alternate tubular elements in the succession have arms as aforesaid.

3. A pipe assembly as claimed in claim 1 in which the bearing surfaces are provided by the end faces of the arms.

4. A pipe assembly as claimed in claim 1 in which the flexible tension-resisting member is a multi-strand wire cable.

5. A pipe assembly as claimed in claim 1 in which the pipe is circumferentially corrugated.

6. A pipe assembly as claimed in claim 1 in which the pipe is helically corrugated.

References Cited in the file of this patent

UNITED STATES PATENTS 401,706    Legat _____ Apr. 16, 1889